9161X

G. W. CLEAVELAND.

Car Truck.

Patented Oct. 14, 1835.

N. PETERS, PHOTO-LITHOGRAPHER, WASHINGTON, D. C.

9161X

Oct. 14. 1835

George W. Cleaveland Baltimore Maryland

Letters Patent.

The Schedule referred to in these Letters Patent and making part of the same, containing a description in the words of the said George W. Cleaveland himself of his improvement in the self adapting Rail Road Car.

Figure 1:
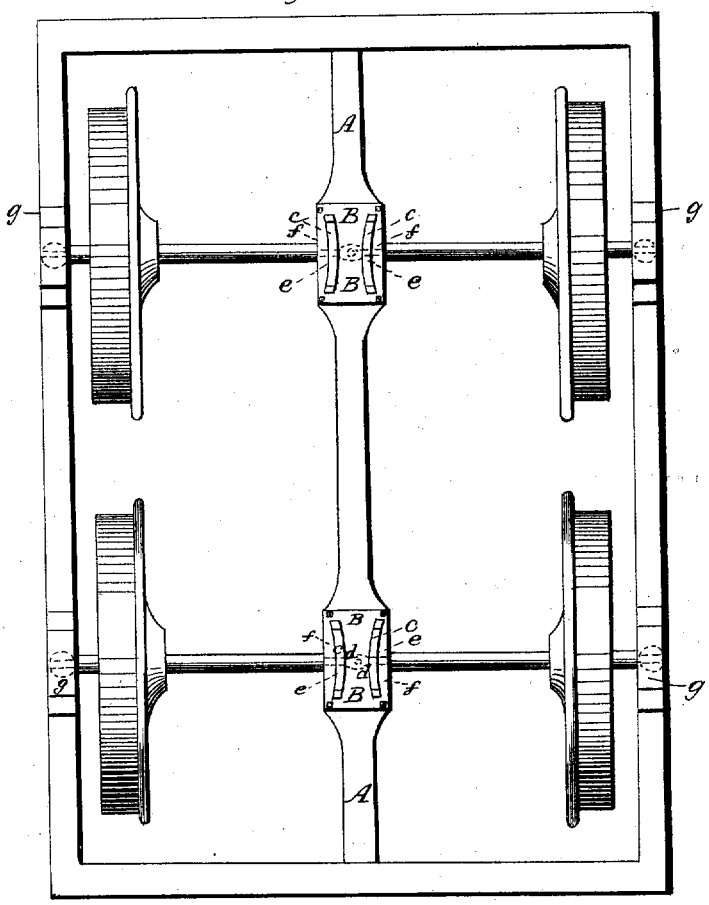
Figure 2:
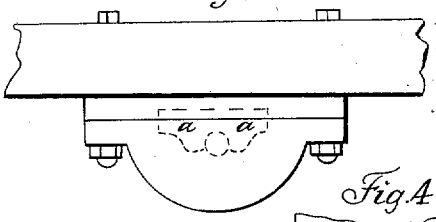
Figure 3:
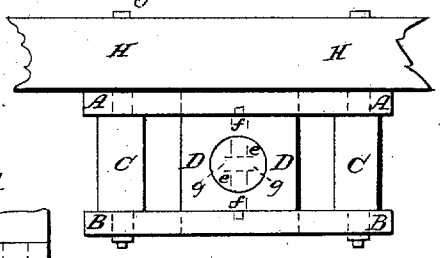
Figure 4:
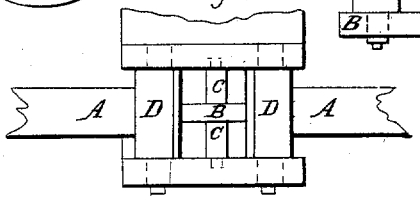

To all whom it may concern. Greeting. Know Ye that I George W. Cleaveland of the City of Baltimore in the State of Maryland have invented a new ~~and~~ useful improvement in the running gear of Rail Road Carriages and the following is a full and complete description of the construction and operation thereof. — The wheels used with my improvement or invention have a perfectly horizontal bearing surface or tread. The conical shape as now in common use being entirely dispensed with and instead of an entire axle with a wheel fast at each end as now used. I divide the axle into two equal parts with inner or central bearings as hereinafter described: and thus leave the wheels to run independently of each other. I connect the semi axles at their inner or central bearings, in the following manner. I make a centre perch part or carriage frame as represented by A A in fig 1 of the annexed drawings for the inner or central bearings of the semi axles & connect them by means of a box consisting of two plates of cast or wrought iron or other material. an upper and an under one. each nine inches in width by twelve inches in length more or less and one inch thick if of cast iron and half an inch ~~thick~~ if of wrought iron. the plates three inches apart and connected together and fastened to the centre perch by means of four screw bolts passing respectively through the corners of the plates and the centre perch. The distance of three inches between the plates being preserved by means of four thimbles each three inches long. through which the four screw bolts pass between the respective corners of the plates. Or the under plate may be made with solid sides instead of the thimbles & screw bolts. In each of the plates and corresponding to each other above and below I make two mortises as exhibited in Fig. 1. on the draught of the Plate B B. each mortise being one inch wide and of a length proportionate to the distance between the wheels fore and aft. or in other words

9161X to the amount of vibration that may be necessary to enable the wheels to conform
to the direction of the Rails. These mortises are in shape the arc of a circle
having the semi-axle for a radius and for its centre the centre of the revolving box
of the outer journal herein after described. In this box thus constructed I place
two vibrating Boxes which are simply two cubical pieces of cast iron or
other metal three inches more or less in length breadth and thickness
with two flanches on each one above and one below on the inner side to
work in the mortises in the plates, and corresponding thereto in shape and
acting as guides in the vibrations of the semi axles. Through the centre
of these vibrating boxes in the direction of the semi-axles I make holes of
sufficient size to receive the inner journals of the semi axles which
are turned down to a diameter of one and a half inch more or less leaving
shoulders of three fourths of an inch to work against the vibrating boxes
and prevent the semi-axles from sliding to the centre. The journals of
the semi-axles pass an inch and a half into the vibrating Boxes or farther
if requisite but not so far as to interfere with the Balls on the ends of the
Pivot Lever next hereinafter described. The Pivot Lever which may
be of iron or other metal is made six inches in length more or less according
to the distance between the vibrating Boxes, and of an oval shape with
a ball turned on each end of a diameter equal to that of the inner jour-
nals of the semi axles leaving necks sufficiently small to permit the boxes
to vibrate without infringing upon the necks. The pivot Lever works
on an axis passing through its centre and into the centres of the upper
and under plates. This axis may be a screw bolt passing through the
centre of the centre Boxes and the centre perch and serving as a fastening
thereto. The balls pass into the holes ~~of~~ the vibrating boxes their whole di-
ameter and work therein regulating the vibrations by causing them to cor-
respond in distance and thereby preserving the parallelism of the wheels.
The vibrating boxes may be made to slide over friction Rollers fixed in
the upper plate if preferred. The Boxes in which the outer journals of
the semi-axles work are constructed in the usual manner except in
that in the upper or bearing plate of each box I make a circular de-
pression or bed of a diameter equal to the circular revolving Box
and a depth equal to half the thickness thereof. And in the cap piece I make a
depression or bed to correspond to that of the bearing plate. The revolving
box is made circular four and three fourths inches more or less in diameter
and two inches more or less in thickness exclusive of the bearing groove
of the outer journal of the semi-axle to work in, and is sunk one inch
more or less, into the plate and cap of the Box. The groove corresponding in
size to the journal of the semi axles extends throughout the diameter of
the revolving box and embraces one half the journal. and instead of de-
pending on the outer side of the box to prevent the axle from sliding out-
wards. shoulders may be left on the axles to work against the sides of
the revolving boxes. and thus prevent sliding outwards. This improvement
[illegible] invention will allow the wheels of a car to run on the outside of the rails
as well as the inside. and always to conform to the course of the Rail
way. What I claim as my original invention and never known in use
before is the centre Box containing the vibrating boxes and pivot lever which con-
nect the inner bearings of the semi-axle and preserve and maintain the
Y parallelism of the wheels and also the circular revolving box within the out-
er Box which permits the semi axle at the inner bearing as the same are respect-
ively described and explained by the foregoing Specification and the annexed
drawings, or in whatever other manner they may be constructed so that by means of
the same principles of action the vibrations of the semi axles at their inner or centre
bearings may be caused and regulated so as to preserve the parallelism of the wheels
and permit them by means of their flanches to conform to the course of the Rail
way — Witness Samuel C Manning George W. Cleveland Exd. M.H.C.
John Penniman

[illegible] (Patented October 14. 1835)

(Drawing)